United States Patent [19]

Murata et al.

[11] 4,315,541

[45] Feb. 16, 1982

[54] DEVICE FOR SCRAPING OFF DEPOSITS FROM INTERNAL SURFACES OF ELONGATED TUBES

[75] Inventors: Sadao Murata, Takaishi; Tadanobu Numata, Kamakura, both of Japan

[73] Assignees: Mitsui Toatsu Chemicals Incorporated; Toyo Engineering Corporation, both of Tokyo, Japan

[21] Appl. No.: 70,615

[22] Filed: Aug. 29, 1979

[30] Foreign Application Priority Data

Sep. 6, 1978 [JP] Japan .................. 53-108514

[51] Int. Cl.³ .............................. F28F 9/24
[52] U.S. Cl. .................. 165/94; 165/109 R; 366/335; 422/135
[58] Field of Search ........... 165/95, 94, 109 T, 109 R; 422/135; 526/88; 366/335, 332–334

[56] References Cited

U.S. PATENT DOCUMENTS

| | | | |
|---|---|---|---|
| 496,757 | 5/1893 | Theisen | 165/95 |
| 1,080,408 | 12/1913 | Bahr | 165/95 |
| 1,770,208 | 7/1930 | Kemnal | 165/95 |
| 3,384,161 | 5/1968 | Malmstrom et al. | 165/94 |
| 3,801,286 | 4/1974 | Anolick et al. | 165/94 X |

FOREIGN PATENT DOCUMENTS

| | | | |
|---|---|---|---|
| 559139 | 9/1932 | Fed. Rep. of Germany | 366/332 |
| 2224728 | 10/1974 | France | 165/94 |
| 628472 | 11/1961 | Italy | 165/95 |
| 345312 | 3/1931 | United Kingdom | 165/94 |
| 251682 | 1/1973 | U.S.S.R. | 366/335 |

*Primary Examiner*—Sheldon J. Richter

[57] ABSTRACT

Device for scraping off a deposit from the internal wall surface of an elongated tube of relatively small diameter, comprising a helical coil spring which is installed inside the tube and adapted to be reciprocally movable and/or rotatable, said spring scraping off the deposit from the internal wall surface of the tube.

4 Claims, 2 Drawing Figures

F I G. 1
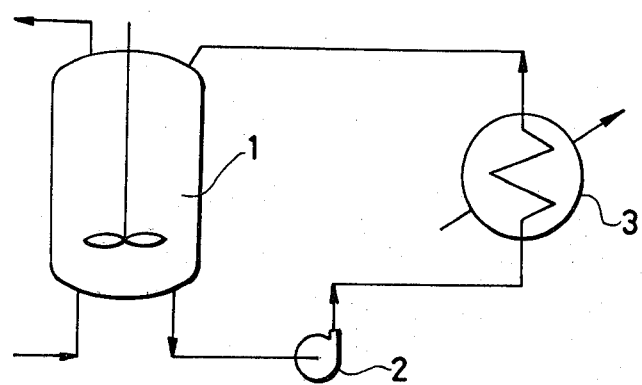
F I G. 2
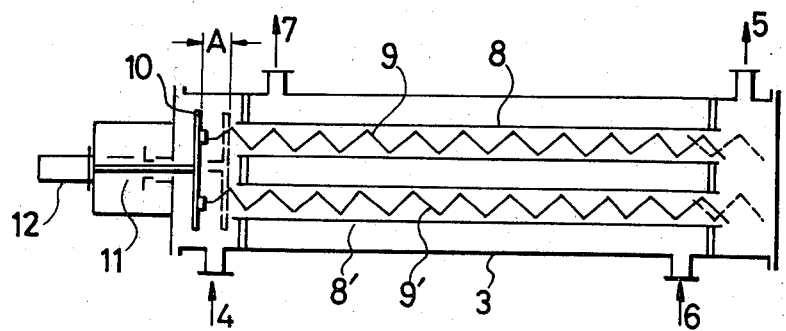

DEVICE FOR SCRAPING OFF DEPOSITS FROM INTERNAL SURFACES OF ELONGATED TUBES

BACKGROUND OF THE INVENTION

1. Field of the Invention

The invention relates to a device for scraping off materials deposited and/or preventing them from being deposited on the internal surface of an elongated tube having a relatively small diameter.

2. Description of the Prior Art

It frequently occurs that a portion of fluid is deposited on internal wall surfaces of tubes and disturbs the operation of a process, wherein tubes are used for reaction, crystallization, evaporation, absorption, cooling, heating or fluid transport. For instance, a process is carried out, wherein continuous polymerization of methacrylic acid ester is conducted in a stirred tank reactor, the resulting polymerization product taken out from the reactor being sent to a multi-tubular head exchanger and cooled therein to remove a portion of the heat of reaction, the fluid being returned into the reactor thereafter, whereby the polymer is deposited on the internal walls of the reactor and the heat exchanger tubes after a long operation. This deposit results in the reduced thermal conductivity of the internal walls which causes an uncontrollably rapid reaction, consequently rendering the process impossible to continuously operate for a long duration.

To solve such a problem, there is proposed a method using a scraper type polymerization tank reactor disclosed by, for an example, Japanese Patent Publication No. 2645/1965. This method comprises a stirred tank polymerization reactor provided with a screw type agitator in a draft tube, with scraper blades being fixed on the edge of the screw of the screw type agitator and adapted to be pressed against the internal wall of the draft tube to scrape off material therefrom. The screw type agitator is also provided with a horizontal arm on the screw drive shaft thereof, with scraper blades attached on said arm to scrape off deposits from the internal wall of the jacket and the external wall of the draft tube, and thus the polymerization is conducted while those surfaces are being scraped. However, this method requires structures such as rotating blades inside a device, and therefore, is not suitable for a reactor having a small internal diameter, especially to a multi-tubular heat exchanger for scraping the internal walls of its tubes.

SUMMARY OF THE INVENTION

An object of the invention is to provide a simple and effective device for scraping off the materials deposited on the internal walls of an elongated tube having a relatively small diameter.

The aforementioned object is met by a device for scraping off the deposit from the internal surface of an elongated tube having a relatively small diameter. The device comprises a helical coil spring which is installed inside the tube and adapted to be reciprocally movable and/or rotatable, the coil spring scraping off the deposits from the internal surface of said tube. The device according to the invention is especially suitable for scraping off the deposits from the internal surface of a tube of a multi-tubular heat exchanger (shell-and-tube heat exchanger).

BRIEF DESCRIPTION OF DRAWINGS

FIG. 1 shown schematically an externally recirculating reaction device as an example of the object in which the device according to the invention is installed, and FIG. 2 shows an external cooler (shell and tube type) in which the device according to the invention is installed.

DETAILED DESCRIPTION OF THE INVENTION

Referring to FIG. 1, the reaction device consists of a reactor 1, a recirculating pump 2 and an external cooler 3, wherein the reaction heat is transferred through the heat transfer tubes of the external cooler to the coolant flowing through the shell side of the same cooler.

Referring to FIG. 2, the external cooler 3 is a conventional multi-tubular heat exchanger. The reaction product is transferred by the recirculating pump 2 from the reactor 1 through the reaction product inlet port 4 into the heat transfer tubes 8 and 8' and expelled through the fluid exit port 5. The coolant passes through the coolant inlet port 6 into the shell side and, after exchanging the heat from the reaction product, flows out through the coolant exit port 7.

Inside the heat transfer tubes are provided the reciprocally moving helical coil springs 9 and 9', each of which having its one end attached to the panel 10. The panel 10 is externally driven by the reciprocating drive unit 12 which is operated continuously or intermittently (the drive unit is of a conventional type for this kind of application). The gauge of the wire constituting the helical coil spring is not specifically limited, but may be large enough to prevent excessive elongation and contraction of the spring due to the resistance of the flowing fluid or the deposit on the tube wall against the reciprocating and/or rotational motion of the helical coil spring. The gauge of the wire is preferred to be as small as possible so far as the above mentioned condition is met. The sectional contour of the wire forming the helical coil spring 9 may be circular or of any other shape. For example, the adequate gauge of a wire is $0.5 \sim 5$ mm for a multi-tubular heat exchanger to be used in the continuous polymerization of methacrylic acid ester.

The pitch length of the helical coil spring cannot be specified, depending on the inside diameter of the tube, the travel distance of reciprocating movement of the spring etc., but may preferably be $1/10 \sim 10$ times as large as the inside diameter of the tube.

The travel distance A of a helical coil spring of not less than three fourth of its pitch length is sufficient to attain the effective scraping effect if the longitudinal flexibility of the spring is taken into account, however, it may preferably be more than one pitch length if the scraping action is to cover the whole area of the internal wall of the tube even when no longitudinal extension of the spring is expected.

The travel speed of the helical coil spring is determined, based on the rate of reaction, the rate of heat transfer of the tube and the rate of deposition on the tube wall. For instance, one reciprocating motion per 10 minutes may be necessary when the rate of reaction or deposition is high, but, on the contrary, the intermittent operation such as one reciprocating motion per day may be sufficient if the rate of deposition is low. The travel speed is recommended, from the points of the wear of the helical coil spring and the required power of drive unit, to be as low as possible.

The helical coil spring is preferably so inserted into the tube that it contacts with or has small clearance with the internal wall of the tube. However, the diameter of the coil of the spring need not be intentionally made to assure positive contact of the spring with the internal wall of the tube since the spring extends and contracts for the reciprocating motion or bows down by gravitational force when the spring is horizontally set.

The scraping device according to the invention has the following advantages.

(1) The light weight, the slight resistance against flowing fluid and the short travel distance and low speed of motion of the device are all combined to allow the use of a small size drive unit, resulting in lowering the cost of power consumption and facility construction.

(2) The flexibility of the helical coil spring permits its soft and close contact with the tube wall, resulting in a small degree of wear of the spring material and the effective scraping of internal walls of tubes even though the tubes are curved.

(3) The small surface area of the helical coil spring reduces the amount of deposits on its surface, and minimizes the reduction of the effective volume of a tube and accordingly the pressure drop of flowing fluid.

(4) The velocity of flowing fluid adjacent to the internal wall of a tube should be much less than that in the central portion of the tube, however, the sliding action of the helical coil spring along the internal wall serves to make the velocity distribution uniform and increases the heat transfer coefficient and effective volume of the tube.

As described heretofore, the device according to the invention is of simple structure, has sufficiently effective scraping action, allowing long and continuous operation of high efficiency which will lead to the wide application of the device in various fields of industries.

The device can widely be used for scraping off the deposit and/or preventing from adhesion of same on the internal wall of an elongated tube of relatively small diameter, in which is carried out reaction, crystalization, evaporation, absorption, cooling, heating or fluid transport. For example, the device is favorably used in the following area.

(1) In the evaporation-concentration or evaporation-crystalization processes of sea water or other various salt solutions, the deposit is prevented from forming or scraped off of the crystal of $CaCO_3$, $Mg(OH)_2$, $CaSO_4$, $Na_2CO_3$, $FeSO_4$ or $Na_2SO_4$.

(2) In the cooling-crystalization processes of various salt solutions, the crystalline deposit is prevented from forming or scraped off of $NH_4NO_3$, $KNO_3$, $KClO_4$, $Na_2CO_3.10H_2O$, $Na_2SO_4.10H_2O$, $Na_2HPO_4.12H_2O$ etc.

(3) In the production processes of such various polymers as polyvinyl chloride, polyethylene, polypropylene, polystyrene and various polymethacrylic acid esters or their copolymers, the deposit is prevented from forming or scraped off. Now the invention will be described in detail by referring to an example. However, the example shown herein is merely for illustrating the invention and should not be construed as limiting the scope of the invention.

EXAMPLE

In the externally recirculating reaction device shown in FIG. 1, the polymerization of methylmethacrylate was carried out, wherein the stirred tank reactor 1 having an inside volume 30 liters was used, the multi-tubular heat exchanger 3 having seven tubes of 1 inch nominal diameter and a length of 1.5 meters and a gear type transfer pump 2 of an output of 50 liters/hr. The multi-tubular heat exchanger was equipped with the internal wall scraping device for tubes as shown in FIG. 2. The scraping device has in each tube a helical coil spring of an overall length of 1.5 meters, the wire diameter was 2 mm and coil pitch was 25 mm, the clearance between the tube wall and the spring being 0.5 mm.

Continuous polymerization was carried out under a reaction temperature of 60° C. by continuously supplying at the rate of 12 kg/hr to the stirred tank reactor the feed methylmethacrylate monomer added with benzoyl peroxide of 0.1% by weight. The liquid reaction product was continuously discharged from the bottom of the reactor, fed into the multi-tubular heat exchanger, recirculated back to the reactor at the rate of 50 liters/hr, and at the same time the same amount of the liquid reaction product as that of the feed material was continuously withdrawn from the top of the bath. Cooling water was fed into the jacket of the reactor and also into the shell side of the multi-tubular heat exchanger, with the reaction temperature being maintained at 60° C. Throughout the whole period, the helical coil spring was kept driven in the reciprocating motion at a frequency of once every five minutes, the speed of 10 mm per sec. and the stroke of 75 mm.

The polymerization ratio on the first day when the polymerization was initiated was 40 percent. Although it was reduced to 35 percent after 20 days continuous operation, the operation was very stable.

After the completion of the operation, the inside of the multi-tubular heat exchanger was cleaned and checked. However deposits on the tube wall were hardly found.

Control

Continuous polymerization was conducted using the same operation conditions as in the case of the example except that no tube wall scraping device was used in this case. On the third day after initiation of continuous polymerization, it became very difficult to maintain the reaction temperature constant probably due to the fact that reduced heat transfer rate was caused by the progressive deposition of the polymer on the tube internal wall. On the fifth day of the operation, the uncontrollable rapid reaction occurred, causing the operation to be stopped. The polymerization ratio three hours before the interruption of the operation was as low as 37 percent. Similar to the case of the example, the inside of the multi-tubular heat exchanger was cleaned and checked only to find excessive deposits of a gel-type polymer covering the entire area of the internal walls of the tubes.

What is claimed is:

1. A device for scraping off a deposit of a polymer from the internal wall surface of the heat transfer tube of a multi-tubular heat exchanger for an external cooler to be used for a continuous polymerization process, the resulting liquid polymerization product being passed through said heat transfer tube; said device comprising a plurality of flexible, helical coil springs each of which is adapted to be installed in a respective one of the tubes and is sized so as to have a small clearance from the internal wall of the tube, the pitch length of each said flexible, helical coil spring being from one-tenth to ten times the length of the internal diameter of said tube; means for reciprocally moving each said flexible, helical coil spring for the length equivalent to at least three-fourths of the pitch length of said flexible, helical coil spring; and means for coupling one common end of the coil springs to the means for reciprocally moving each said flexible, helical coil spring whereby each said flexible, helical coil spring scrapes off the deposit from the internal wall surface of its respective tube.

2. A device as claimed in claim 1, wherein the speed of continuous motion of said flexible helical coil spring is at least one reciprocating motion per ten minutes.

3. A device as claimed in claim 1, wherein said flexible helical coil spring is intermittently and reciprocally moved at a frequency of at least once a day.

4. A device as claimed in claim 3, wherein said flexible helical coil spring is intermittently and reciprocally moved at a frequency of at least once every ten minutes.

* * * * *